Dec. 28, 1965 E. P. G. WRIGHT 3,226,482
SELECTIVE TRANSMISSION OF PRIORITY CODED MESSAGE SIGNALS
Filed Sept. 21, 1961
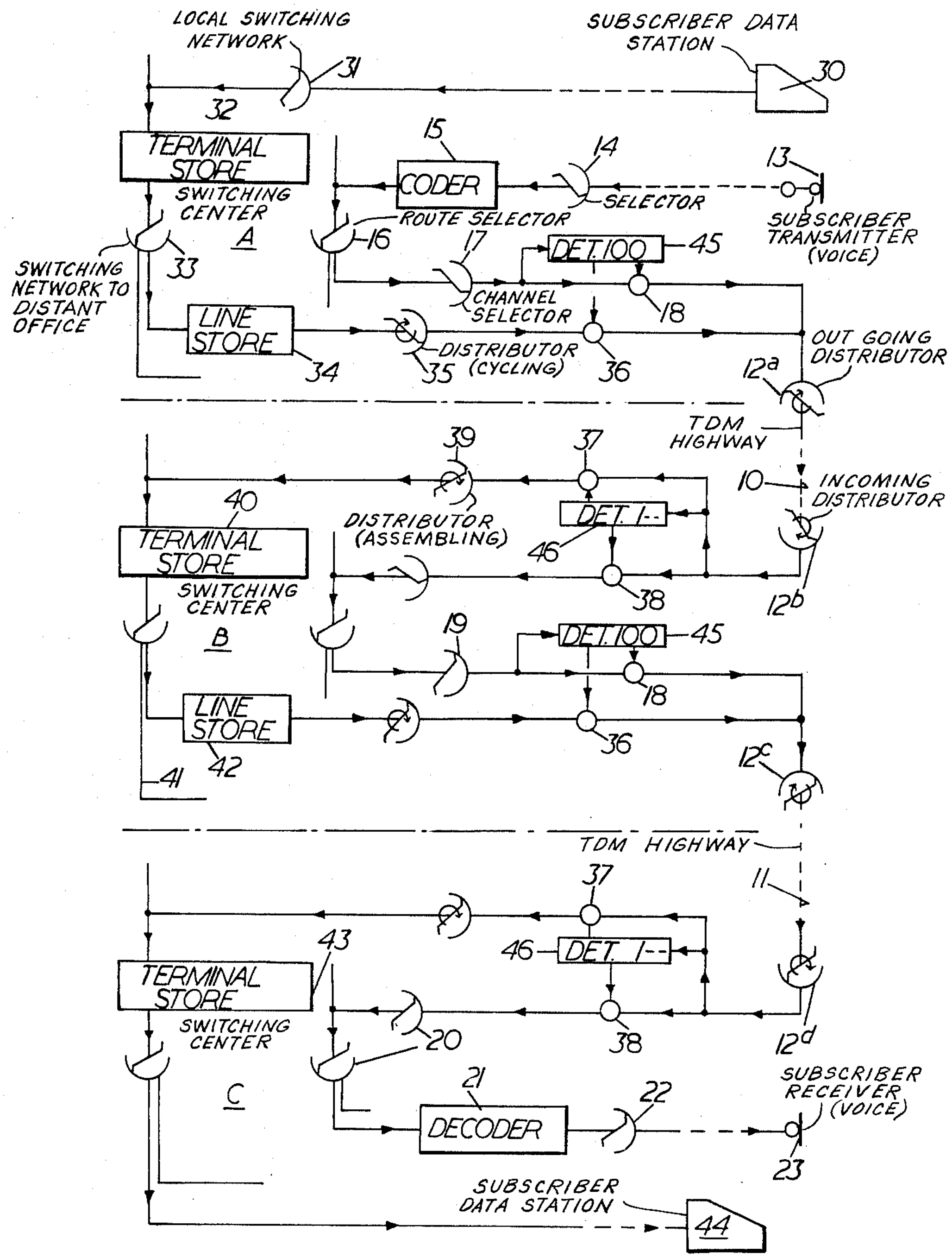
Inventor
E. P. G. WRIGHT
By Paul W. Hemminger
Attorney United States Patent Office 3,226,482

Patented Dec. 28, 1965

3,226,482
SELECTIVE TRANSMISSION OF PRIORITY CODED MESSAGE SIGNALS

Esmond Philip Goodwin Wright, London, England, assignor to International Standard Electric Corporation, New York, N.Y., a corporation of Delaware Filed Sept. 21, 1961, Ser. No. 139,701
Claims priority, application Great Britain, Sept. 23, 1960, 32,785/60
10 Claims. (Cl. 179—15)

This invention relates to telecommunication systems.

According to the invention, telecommunication terminal apparatus transmits intelligence originating in any one of a group of sources designated as having high-priority and in a source or group of sources designated as having low-priority. Normally, the apparatus allocates the high-priority source to a channel outlet. When the intelligence content, represented by a predetermined criterion, offered by the high-priority source for transmission at the outlet falls below a critical level, the outlet is made available for connection to a low-priority source. The outlet is again allocated to the high-priority source when the intelligence offered for transmission by the allocated high-priority source again exceeds the critical level.

The terminal apparatus preferably includes storage means in which intelligence from the low-priority source or sources is assembled. This stored low-priority intelligence is passed to the channel outlets as they become available for its transmission. To do this, distribution means repetitively examines all the channel outlets and connects an output of the storage means to an outlet currently available for the transmission of low-priority intelligence.

The nature of the level criterion for determining the occupancy of an outlet by a high-priority or a low-priority source will depend both on the nature of the intelligence to be transmitted and the nature of the transmission link. In the preferred embodiment of the invention, the high-priority sources of intelligence are the subscribers' lines or their equivalent in a telephone service. The voice frequency signals appearing on these lines are amplitude sampled and coded for transmission; the code group corresponding to voice frequency signal amplitudes below the lowest sampling level is then used to indicate the availability of the channel for the transmission of low-priority intelligence.

In such an arrangement the low-priority signals may consist, for example, of digitally coded data groups for transmission between data processing centres.

The invention is particularly applicable to multi-channel systems operating on a time division multiplex basis over common physical links. Such a system, embodying the invention in its preferred form, will now be described with reference to the accompanying drawing, which shows a simplified schematic diagram of the system.

The drawing represents three switching centres A, B and C connected by lines 10 and 11. Each provides, over a single physical link, a plurality of communication channels. This is achieved by adopting the time division multiplex technique, in which each channel is represented by a given time interval in a recurring cycle of time intervals. Synchronized cycling distributors 12*a* to 12*d* for connecting the line terminations to the terminal apparatus of each channel in turn are shown in the figure as a diagrammatic representation of this mode of transmission.

The switching centres A, B and C may all be identical, but in the drawing only those parts of each centre relevant to an understanding of the present invention are shown. The apparatus employed at each centre comprises units such as storage coding and routing devices which are themselves well known and need not therefore be described here in detail.

The system will be described in terms of its operation in effecting transmission between transmitting and receiving telephone subscribers' apparatus and between transmitting and receiving data subscribers' apparatus.

The circuits appropriate to the transmission of signals between the telephone subscribers' apparatus are fairly conventional and need only be briefly described. The voice frequency signals originate in the transmitting subscribers' apparatus 13. After passing through the exchange switching circuits represented by the selector 14, these signals are amplitude sampled and coded in the coder 15. The output of coder 15 consists of a series of electrical signal groups each representing, according to a pre-arranged code, the instantaneous amplitude of the voice frequency signal at a particular instant. The duration of each signal group is such that it can be transmitted within the time interval in the line 10 appropriate to a single channel. The signal group repetition frequency is the same as the cycling frequency of the distributors 12*a* and 12*b*. Further switching circuits 16 select the route A–B for the outgoing signals and a selector 17 selects a vacant channel on line 10 for their transmission. The signals are passed to the channel outlet (represented by the appropriate connection on distributor 12*a*) through a gate 18, the purpose of which will be described hereinafter.

At the intermediate switching centre B the pulse groups representing the voice frequency signals are passed without de-coding through the switching circuits of the centre and are passed out to line 11 through the further channel selector 19.

At the receiving switching centre C, the signals are routed by the local switching circuits 20 to the decoder 21 which re-assembles the voice frequency signals and passes them through the further switching circuits represented by the selector 22 to the receiving subscribers' apparatus 23.

The arrangement so far described thus essentially consists of a conventional telephone network employing pulse code modulation for transmission. The system also includes a very similar data transmission system operating over the same lines 10 and 11; this system will be briefly outlined and the manner of its integration with the telephone system then described.

Incoming data signals from a data subscriber's transmitting apparatus 30 are passed through the local switching circuits 31 to a main terminal store 32. Data required for transmission over the line 10 to centre B is routed by switch 33 to a line store 34, the output of which is connected to a cycling distributor 35 synchronized with the line distributors 12*a* and 12*b*. The output of store 34 is thus offered successively for transmission over each channel in turn of the system; a gate 36 determines whether or not data so offered is accepted for transmission.

At the intermediate switching centre B, the data signals are routed by the selective operation of further gates 37 and 38 to the assembling cycling distributor 39, from which the assembled data is passed to the store 40. Data required to be transmitted to a local subscriber at centre B is extracted from the store 40 and fed out over line 41. Data required for re-transmission over line 11 to centre C is passed from terminal store 40 to line store 42 and is then transmitted in the manner already described over line 11 to centre C.

The data is assembled in terminal store 43 of centre C and is then extracted and passed over the local line to the receiving subscribers' apparatus 44.

Means are provided for identifying and choosing the data and speech signals for transmission over the lines 10 and 11. It is assumed for simplicity that both the coded speech and the data signals consist of groups of three decimal digits. The first digit of each group does not carry speech or data information but is used to distinguish between the two, all data groups originating from the transmitting apparatus 30 having "0" for their first digit and all outputs from the coder 15 having "1" for their first digit.

The switching circuits of the telephone network already described operate on the principle of the permanent allocation of a channel of line 10 to a particular calling subscriber for an appreciable duration of time, for example for the duration of an entire call. In this case the actual busy time of each channel may be as low as 20% of its occupied time. Thus, the invention seeks to improve this utilization factor of the transmission channels, up to a theoretical maximum of 100%, by arranging for data signals held in line store 34 to be transmitted over any channel for which the intelligence content of the speech signals falls below a pre-determined level.

The speech coding process performed by the coder 15 consists in identifying a number of predetermined amplitude levels of the input voice frequency waveform and in generating output code groups corresponding to the particular range of amplitude levels within which the waveform amplitude is located at the sampling instant. If the voice frequency amplitude is lower than the lowest sampling level, the coder output will consist of a pulse group representing zero amplitude level. Thus, this zero signal may be piven in the present example by a coded pulse group having a value of "100." A detector unit 45 is arranged to respond to the pulse group 100 by closing gate 18 to coder output signals and opening gate 36 to allow data signals from store 34 to pass to line 10. A detector unit 45 is provided for each individual channel of the system and determines at each time interval corresponding to that channel whether or not significant speech information is to be transmitted.

The receiving terminal apparatus at switching centres B and C includes a further detector unit 46 arranged to be responsive to all speech code groups, that is to say to all code groups having initial digit "1," which are passed through gate 38 to the speech switching circuits of the centre. A further gate 37, opened for pulse groups with initial digit "0" passes the data signals to the appropriate circuits of the centre.

The operation of the system in handling mixed speech and data traffic is set out schematically in Table A, which shows the signal groups passed over six channels forming one of the links 10 and 11 for successive operating cycles (*a*) to (*q*).

In the table digital code groups starting with 1 indicate that the remainder of the group expresses a speech content, while the italicised groups starting with 0 carry data information. Thus the initial state of the system during cycle (*a*) is an idle condition with all channels connected to speech outlets, indicated by all channels carrying code group 100. During cycle (*b*) the speech content of channel No. 2 rises above the critical sampling level, so that during this cycle and successive cycles the chanel passes code groups representing the instantaneous amplitude of the voice-frequency input from the appropriate subscriber's line. Similarly, other channels commence to carry significant speech information as the input from the subscriber's line allocated to them rises above the critical sampling value.

TABLE A

| Cycle | Channel | | | | | |
|---|---|---|---|---|---|---|
| | 1 | 2 | 3 | 4 | 5 | 6 |
| a | 100 | 100 | 100 | 100 | 100 | 100 |
| b | 100 | 107 | 100 | 100 | 100 | 100 |
| c | 100 | 128 | 100 | 103 | 100 | 100 |
| d | 100 | 169 | 100 | 144 | 100 | 103 |
| e | 000 | 147 | 001 | 127 | 002 | 106 |
| f | 003 | 117 | 004 | 116 | 005 | 109 |
| g | 006 | 101 | 007 | 109 | 008 | 112 |
| h | 009 | 100 | 010 | 111 | 011 | 115 |
| i | 012 | 013 | 014 | 103 | 015 | 118 |
| j | 016 | 017 | 018 | 101 | 104 | 121 |
| k | 103 | 019 | 102 | 105 | 108 | 124 |
| l | 111 | 020 | 108 | 106 | 114 | 127 |
| m | 117 | 104 | 115 | 104 | 120 | 130 |
| n | 102 | 102 | 102 | 102 | 102 | 102 |
| o | 100 | 100 | 100 | 100 | 100 | 100 |
| p | 021 | 022 | 023 | 024 | 025 | 026 |
| q | 027 | etc. | | | | |

During the first four cycles (*a*) to (*d*) of operation no data signals are presented for transmission. At the commencement of cycle (*e*), a data message which may be represented as 00, 01 . . . . . . . . . . 27 becomes available for transmission. The identification digit "0" of the data group 000 seizes the idle channel 1 for its transmission. Subsequent data groups are transmitted over such channels as happen to be idle as they occur in the cycling sequence. When the speech input from the associated subscriber's line rises above the critical sampling level, as during cycle (*k*) for channel 1, the channel is closed against acceptance of further data signals and continuous normal transmission of speech code groups.

It will be noted that the normal idle condition of each channel is represented by code group 100. That is to say, the channel is available for speech signals but is actually idle at the appropriate instant. 000 does not represent an idle channel but a significant data signal.

It will be appreciated that the mode of operation indicated in Table A is schematic only, since the actual duration of periods of occupancy of any one channel by speech signals will be much longer than indicated in the table. Similarly in any practicable system more complex code groups than two significant decimal units will be necessary.

It will be evident that the speed of transmission of data signals over the system must be integrated with that adopted for the transmission of speech signals. This signalling speed may not coincide either with the rate at which data is fed into the system or with the rate at which it is finally extracted. The provision of stores for the data signals at the switching centres enables the handling speed of the data signals to be varied in accordance with local requirements.

While the principles of the invention have been described above in connection with specific apparatus and applications, it is to be understood that this description is made only by way of example and not as a limitation on the scope of the invention.

What I claim is:

1. A time division multiplex system comprising a plurality of channels defined by recurring time slots, a plurality of sources of intelligence signals having either high or low priority status, means responsive to said sources for providing pulse signal samples modulated according to said intelligence and coded according to the priority of the signal source, means responsive to said priority signals for developing a criteria signal which rises or falls to represent the general level of priority status of the samples being presented for transmission, means for normally assigning said channels to the transmission of the high priority samples, and means responsive to the fall of said criteria signal below a critical level for assigning said channels to the transmission of said low-priority samples.

2. Apparatus according to claim 1 and storage means in which intelligence from the low-priority source is assembled, and means responsive to said criteria signal for transmitting the stored low-priority intelligence to the channel outlets as they become available for such transmission.

3. Apparatus according to claim 2 including distribution means which repetitively examines all the channel outlets for said codes, and means for connecting an output of the storage means to an outlet available for the transmission of low-priority intelligence.

4. Apparatus according to claim 1 and means wherein intelligence originating in at least one high-priority source consists of successive groups of electrical signals each representing an instantaneous amplitude value of a voice-frequency input waveform.

5. Apparatus according to claim 4 and means wherein the critical level occurs when intelligence offered by the high-priority source for transmission is the lowest amplitude level other than zero level of the voice-frequency waveform capable of representation by a coded signal.

6. Apparatus according to claim 4 and means wherein intelligence originating in the low-priority sources consists of successive groups of electrical signals coded as said high-priority signals are coded, each code representing an item of intelligence.

7. Apparatus according to claim 1 and means wherein transmitted intelligence is identified as high-priority or low-priority intelligence by a transmitted characteristic of the intelligence itself.

8. Apparatus as claimed in claim 7 and a telecommunication link including transmitting terminal arranged to be connected over said plurality channels to a receiving terminal, said receiving terminal including means for identifying high-priority and low-priority intelligence by the said transmitted characteristic thereof, and means responsive to said identification for routing the said intelligence to appropriate destinations.

9. The apparatus according to claim 8 and means wherein the receiving terminal apparatus includes storage means in which low-priority intelligence received over the channels is assembled.

10. The apparatus of claim 9, there being at least two of said telecommunication links disposed to provide serial point-to-point communication, means arranged so that intelligence from a high-priority source can be transmitted over a connection set up by the simultaneous use of channels of both links coupled in tandem, and means for transmitting said low-priority intelligence over each link in turn, said low-priority intelligence being stored at a transmitting terminal in each of said links until a channel becomes available for it.

References Cited by the Examiner

UNITED STATES PATENTS

| | | | |
|---|---|---|---|
| 2,220,883 | 11/1940 | Berger et al. | 179—4 |
| 2,279,295 | 4/1942 | Blanton | 340—147 |
| 2,303,377 | 12/1942 | Melhose | 179—4 |
| 2,506,437 | 5/1950 | Watson | 178—5.6 |
| 2,766,378 | 10/1956 | Sundin et al. | 328—154 |
| 2,823,261 | 2/1958 | Zipf | 179—3 |

DAVID G. REDINBAUGH, *Primary Examiner.*